March 8, 1955     W. J. B. WESTERMAN     2,703,698
COUNTERBORING ROTARY DRILL
Filed Sept. 17, 1951
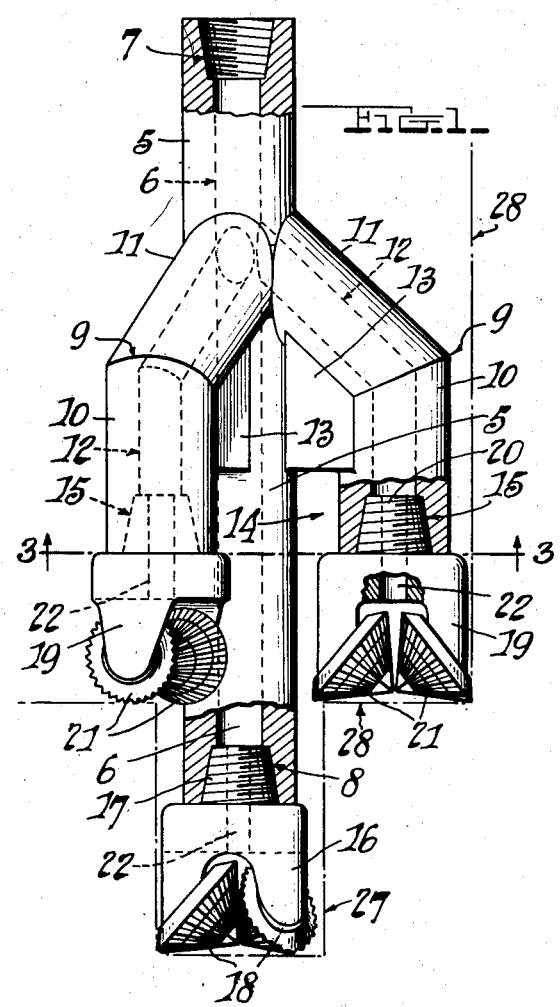
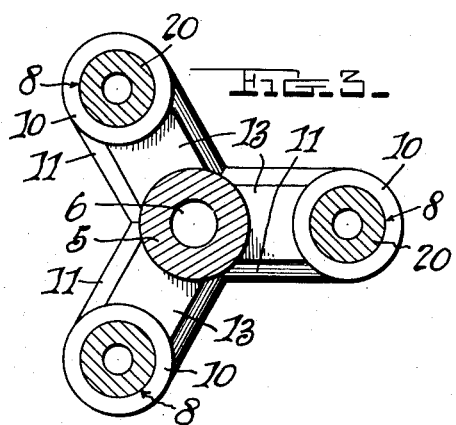
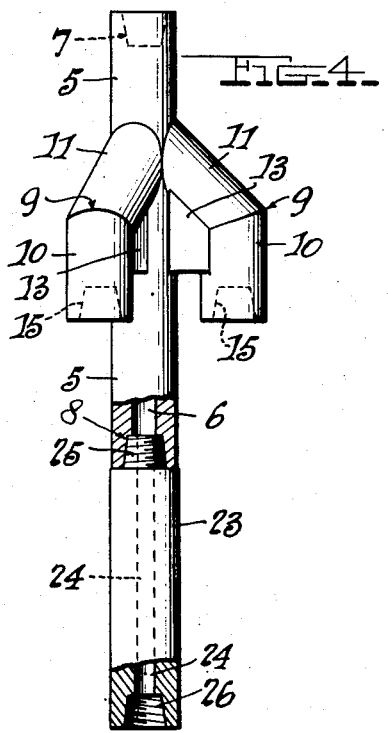
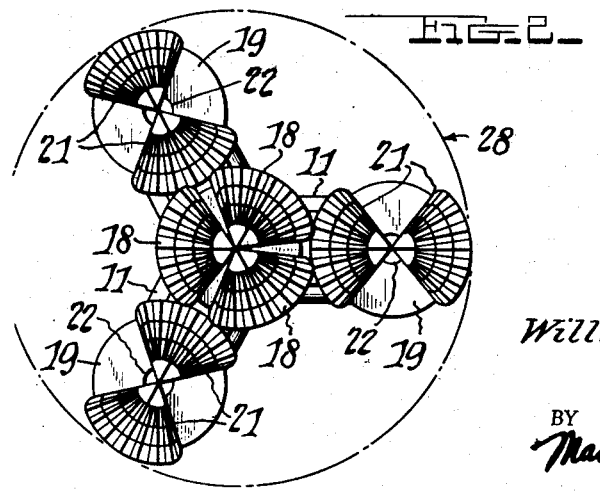
INVENTOR
William J. B. Westerman
BY
Mason, Porter, Diller & Stewart
ATTORNEYS

2,703,698

COUNTERBORING ROTARY DRILL

William J. B. Westerman, Pecos, Tex.

Application September 17, 1951, Serial No. 246,990

10 Claims. (Cl. 255—306)

The invention relates generally to rotary drill structures and primarily seeks to provide a novel form of rotary drill adapted for the drilling of irrigation wells or the like and wherein there are provided means for simultaneously forming a pilot hole and a full diameter controlling counter-bore.

Drill heads having pilot hole cutting means and cooperating reamers effective to enlarge the pilot hole to provide a sufficiently large hole diameter are well-known, but certain difficulties have been experienced in the use of such heads because of the size and weight thereof and tendencies to bore off line. The difficulties experienced because of unnecessarily large mass and weight include high cost and handling troubles, and when faulty structures have so commonly resulted in the provision of off line borings, it has been, in some cases, impossible properly to insert the well casings, or it has been necessary to make bores much larger in diameter than the diameter of the tubing to be inserted therein. It is a purpose of the present invention to provide a drill head structure wherein weight and mass are held at a practical minimum and yet accurate and straight boring is assured.

In its more detailed nature, the invention resides in providing a drill head including a longitudinal tubular body adapted to be disposed uprightly and rotated about its longitudinal axis, and three tubular extensions spaced outwardly from the body and paralleling the same intermediately of the ends thereof and all terminating in a common horizontal plane at their lower ends and connected by connecting legs at their upper ends with the body and its hollow interior, there being included a multiple cone cutter removably attached to the lower end extremity of each of said body and said three paralleling tubular extensions.

Another object of the invention is to provide a drill head of the character stated wherein a triple cone cutter is mounted on the lower end extremity of the tubular body, and a two cone cutter unit is mounted on the lower end extremity of each of the three paralleling tubular extensions, with the axes of its cones lying in a plane extending radially with relation to the axis of the tubular body.

Another object of the invention is to provide a drill head of the character stated wherein the longitudinal body and each tubular extension and the cutter thereon are of such diameters as to provide a clear space between said body and the adjacent paralleling portion of each tubular extension and the cutter thereon.

Another object of the invention is to provide a drill head of the character stated wherein the longitudinal body is extended well beyond the position of the two cone cutters, a web is provided joining each tubular extension with the adjacent portion of the longitudinal body and defining the lower limit of the particular clear space, and the distance radially across the two cones of each two cone cutter is such that the sets of two cone cutters will make an annular cut overlapping inwardly slightly over the cut made by the single triple cone cutter.

Another object of the invention is to provide a drill head of the character stated wherein the upper end extremity of the longitudinal body is provided with means for effecting removable attachment thereof to a carrying string, a tubular extension piece also being removably secured to the lower end extremity of said longitudinal body, and one of the multiple cone cutters being removably attached to the lower end of said extension piece.

With the above and other objects in view that will hereinafter appear, the nature of the invention will be more fully understood by following the detailed description, the appended claims and the several views illustrated in the accompanying drawings.

In the drawings:

Figure 1 is a side elevation illustrating a counterboring rotary drill head embodying the invention, parts being broken away and in section.

Figure 2 is an inverted plan view of the head shown in Figure 1.

Figure 3 is a horizontal section taken on the line 3—3 of Figure 1.

Figure 4 is a side elevation illustrating the mounting head with the multiple cone cutters removed and with an extension piece removably attached to the lower end thereof.

In the example of embodiment of the invention herein disclosed, the improved drill head is shown as including a longitudinal tubular body 5 providing a fluid course 6 therethrough from end to end and having a female taper thread socket 7 at its upper end and a similar socket 8 at its lower end.

Three tubular extensions 9 are provided and spaced 120° about the body 5, and each thereof includes a body portion 10 and an angular connection portion 11 joining with the main body 5. A fluid course 12 extends through each extension 9, 11 and joins at its upper end with the hollow interior of the main body, and a strengthening web 13 joins each said extension 9, 11 with the adjacent wall portion of the main body 5 and defines the upper limit of a clear space 14 provided between each extension leg 10 and said main body. It will also be apparent by reference to Figures 1, 3 and 4 that a taper thread socket 15 is provided in the lower end extremity of each extension leg 10.

A triple cone cutter generally designated 16 has its male thread shank 17 removably secured in the lower end socket of the main body 5, and it is to be understood that the three cones 18 are of the small tooth, roll cutting variety and are mounted on anti-friction bearings so as to be free rolling in the usual manner. A two cone cutter of similar construction and generally designated 19 is mounted on each of the extensions 10, having its male thread shank 20 removably secured in the extension socket 15 in the manner clearly illustrated in Figure 1. The two cones 21 of each of the last-mentioned cutters or units also are of the free rolling type, mounted on anti-friction bearings in the usual manner, and it will be apparent by reference to Figure 2 of the drawing that the axes of the two cones of each said two cone cutter lie in a common vertical plane disposed radially with respect to the axis of the tubular body 5.

It is to be noted that all of the cutter units 16 and 19 are provided with fluid courses or ducts 22 which communicate with the fluid courses 6 and 12 of the main body 5 and the extensions 10, 11, and thus provision is made for freely circulating flushing fluid through the whole head structure.

Should it be desired to extend the triple cone cutter 16 a greater distance below or beyond the two cone cutters 19, a tubular extension piece 23 can be removably attached to the main body 5 in the manner illustrated in Figure 4. The extension piece provides a fluid course 24 and includes a male taper thread extension 25 at its upper end for removable attachment in the main body socket 8, and a female taper thread socket 26 in its lower end in which to removably receive the male taper thread extension 17 of the triple cone cutter 16.

It is to be understood that in use the drill head is secured to the string in the usual manner by removable attachment at the upper taper thread socket 7, and when thus mounted and rotated in the conventional manner, the triple cone cutter will cut a central, relatively small pilot hole 27, and the following two cone cutters 19 will roll about and make an annular cut slightly overlapping the pilot hole inwardly in the manner clearly illustrated in Figure 1 and providing the desired large bore 28.

The particular construction and arrangement of parts herein disclosed assures the drilling of the hole in a true direct line, avoiding all of the problems usually encountered because of deflection of the drill and the cutting of a crooked hole. Because of drill deflection and resultant boring of crooked holes, it has been necessary to make the holes much larger than the diameter of the casing or tubing to be inserted into the hole, thereby to assure proper insertion without binding. These faults result in the use of unnecessarily large and heavy drill heads and cutters. With the drill head and cutter structure herein disclosed, the hole can be drilled very accurately and without danger of objectionable deflection. Therefore, the necessity of using heavy, oversize drill heads is avoided, and insertion of the casing sections or tubing is facilitated without providing any material oversize clearances.

The particular small tooth, free rolling cones provide for smooth cutting without balling up of the cutters. The small cuttings may be likened to a disintegration of the earth and rock, and the flushing away of the cuttings in suspension in streams of water at different elevations avoids confinement of the flushing action at the extreme bottom of the bore and greatly facilitates the boring action. It is found that the clearances about the main body of the head inwardly of the extensions 10 also greatly facilitate the desired cutting action and enable the formation of a relatively light weight equipment including relatively small cutter units.

While example forms of the improved drill head are disclosed in detail herein, it is to be understood that variations in the form and arrangement of the parts may be made without departing from the spirit and scope of the invention as defined in the appended claims.

I claim:

1. A counterboring rotary drill head comprising a longitudinal tubular body adapted to be disposed uprightly and rotated about its longitudinal axis, and three tubular extensions equidistantly spaced about the axis of the longitudinal body and each including a portion spaced outwardly from and paralleling said body and extending therealong intermediately of the ends thereof and all terminating in a common horizontal plane at their lower ends and having their hollow interiors connected through connecting legs with said body and its hollow interior at their upper ends, and a multiple cone cutter removably attached to the lower end extremity of each of said body and said three paralleling tubular extensions, the radially outwardly projected limit of each said cone cutter extending only a short distance outwardly of the radially outwardly extending limit of the carrying extension so that said extensions may engage with the bore wall as it is being drilled and exercise a guiding function in the drilled bore.

2. A counterboring rotary drill head comprising a longitudinal tubular body adapted to be disposed uprightly and rotated about its longitudinal axis, and three tubular extensions equidistantly spaced about the axis of the longitudinal body and each including a portion spaced outwardly from and paralleling said body and extending therealong intermediately of the ends thereof and all terminating in a common horizontal plane at their lower ends and having their hollow interiors connected through connecting legs with said body and its hollow interior at their upper ends, a triple cone cutter removably mounted on the lower end extremity of the tubular body, and a two cone cutter unit removably mounted on the lower end extremity of each of said three paralleling tubular extensions with the axes of its cones lying in a plane extending radially with relation to the axis of the tubular body, the radially outwardly projected limit of each said two cone cutter extending only a short distance outwardly of the radially outwardly extending limit of the extensions which carry the particular two cone cutters so that said extensions may engage with the bore wall as it is being drilled and exercise a guiding function in the drilled bore.

3. A drill head as defined in claim 1 wherein the longitudinal body and each tubular extension and the cutter thereon are of such diameters as to provide a clear space between said body and the adjacent paralleling portion of each tubular extension and the cutter thereon.

4. A drill head as defined in claim 1 wherein the longitudinal body and each tubular extension and the cutter thereon are of such diameters as to provide a clear space between said body and the adjacent paralleling portion of each tubular extension and the cutter thereon, and wherein there is included a web joining each tubular extension with the adjacent portion of the longitudinal body and defining the upper limit of the particular clear space.

5. A drill head as defined in claim 2 wherein the distance radially across the two cones of each two cone cutter is such that the sets of two cone cutters will make an annular cut overlapping inwardly slightly over the cut made by the single triple cone cutter.

6. A drill head as defined in claim 2 wherein the longitudinal body and each tubular extension and the cutter thereon are of such diameters as to provide a clear space between said body and the adjacent paralleling portion of each tubular extension and the cutter thereon, said longitudinal body extending well beyond the position of the two cone cutters, and there being included a web joining each tubular extension with the adjacent portion of the longitudinal body and defining the lower limit of the particular clear space, the distance radially across the two cones of each two cone cutter being such that the sets of two cone cutters will make an annular cut overlapping inwardly slightly over the cut made by the single triple cone cutter.

7. A counterboring rotary drill head comprising a longitudinal tubular body adapted to be disposed uprightly and rotated about its longitudinal axis, and three tubular extensions equidistantly spaced about the axis of the longitudinal body and each including a portion spaced outwardly from and paralleling said body and extending therealong intermediately of the ends thereof and all terminating in a common horizontal plane at their lower ends and having their hollow interiors connected through connecting legs with said body and its hollow interior at their upper ends, means at the upper end extremity of the longitudinal body for removably securing it to a carrying string, a tubular extension piece removably secured to the lower end extremity of said longitudinal body, and a multiple cone cutter removably attached to the lower end of each of said extension piece and said three paralleling tubular extensions, the radially outwardly projected limit of each said cone cutter extending only a short distance outwardly of the radially outwardly extending limit of the carrying extension so that said extensions may engage with the bore wall as it is being drilled and exercise a guiding function in the drilled bore.

8. A drill head as defined in claim 7 wherein the longitudinal body and each tubular extension and the cutter thereon are of such diameters as to provide a clear space between said body and the adjacent paralleling portion of each tubular extension and the cutter thereon, and wherein there is included a web joining each tubular extension with the adjacent portion of the longitudinal body and defining the upper limit of the particular clear space.

9. A counterboring rotary drill head comprising a longitudinal tubular body adapted to be disposed uprightly and rotated about its longitudinal axis, and three tubular extensions spaced equidistantly about the axis of said body and each spaced outwardly from and paralleling said body intermediately of the ends thereof and all terminating in a common horizontal plane at their lower ends and connected by connecting legs with said body and its hollow interior at their upper ends, a triple cone cutter removably mounted on the lower end extremity of the tubular body, and a two cone cutter unit removably mounted on the lower end extremity of each of said three paralleling tubular extensions with the axes of its cones lying in a plane extending radially with relation to the axis of the tubular body, the radially outwardly projected limit of each said two cone cutter extending only a short distance outwardly of the radially outwardly extending limit of the extension which carries the particular two cone cutter so that said extensions may engage with the bore wall as it is being drilled and exercise a guiding function in the drilled bore.

10. A counterboring rotary drill head comprising a longitudinal tubular body adapted to be disposed uprightly and rotated about its longitudinal axis, and three tubular extensions spaced equidistantly about the axis of said body and each spaced outwardly from and paralleling said body intermediately of the ends thereof and all terminating in a common horizontal plane at their lower ends and connected by connecting legs with said body and its hollow interior at their upper ends, a triple cone cutter removably mounted on the lower end extremity of the tubular body, and a two cone cutter unit removably mounted on the lower end extremity of each of said three paralleling tubular extensions with the axes of its cones lying in a plane extending radially with relation to the axis of the tubular body, said tubular body, said three tubular extensions, said two cone cutter units and said three cone cutter unit having communicating fluid courses extending therethrough.

References Cited in the file of this patent

UNITED STATES PATENTS

| | | |
|---|---|---|
| 1,325,944 | Hughes | Dec. 23, 1919 |
| 1,467,479 | Henritzi | Sept. 11, 1923 |
| 2,058,628 | Reed | Oct. 27, 1936 |
| 2,103,583 | Howard et al. | Dec. 28, 1937 |
| 2,261,546 | Gipson | Nov. 4, 1941 |

FOREIGN PATENTS

| | | |
|---|---|---|
| 23,730 | Great Britain | Oct. 28, 1899 |
| 224,967 | Great Britain | Nov. 24, 1924 |
| 887,242 | France | Nov. 8, 1943 |